United States Patent [19]

Karakama

[11] Patent Number: 5,451,850
[45] Date of Patent: Sep. 19, 1995

[54] METHOD OF CORRECTING A POSITION OF A TOOL CENTER POINT

[75] Inventor: Tatsuo Karakama, Minamitsuru, Japan

[73] Assignee: Fanuc Ltd., Yamanashi, Japan

[21] Appl. No.: 64,160

[22] PCT Filed: Oct. 12, 1992

[86] PCT No.: PCT/JP92/01328
§ 371 Date: May 24, 1993
§ 102(e) Date: May 24, 1993

[87] PCT Pub. No.: WO93/07998
PCT Pub. Date: Apr. 29, 1993

[30] Foreign Application Priority Data

Oct. 16, 1991 [JP] Japan .................... 3-267683

[51] Int. Cl.$^6$ .............................. B25J 9/00
[52] U.S. Cl. ................... 318/568.11; 318/632
[58] Field of Search ............ 318/568.11, 632, 638

[56] References Cited

U.S. PATENT DOCUMENTS

| | | |
|---|---|---|
| 3,860,779 | 1/1975 | Marendaz . |
| 4,245,316 | 1/1981 | Koikawa et al. .............. 364/474 |
| 4,967,365 | 10/1990 | Hampl et al. ............. 364/474.15 |
| 4,969,108 | 11/1990 | Webb et al. . |
| 4,979,127 | 12/1990 | Mizuno et al. . |
| 4,986,724 | 1/1991 | Steinmetz et al. . |
| 4,990,743 | 2/1991 | Kugai et al. . |

FOREIGN PATENT DOCUMENTS

| | | |
|---|---|---|
| 0428739 | 5/1991 | European Pat. Off. . |
| 2827711 | 1/1979 | Germany . |
| 59-201740 | 11/1984 | Japan . |
| 60-20893 | 2/1985 | Japan . |
| 1-132343 | 9/1989 | Japan . |

OTHER PUBLICATIONS

Patent Abstracts of Japan, vol. 10, No. 266 (P-496) (2322), Sep. 11, 1986. Japan Patent Application No. 59-211619.

Patent Abstracts of Japan, vol. 2, No. 5 (M-002), Sep. 30, 1977. Japan Patent Application No. 51-33130.

Primary Examiner—Bentsu Ro
Attorney, Agent, or Firm—Staas & Halsey

[57] ABSTRACT

There is provided a method of correcting a position of a tool center point position of lightweight tools such as a welding gun, grinder or the like, and readily handling and controlling robot manipulation programs. Data indicating the relationship between robot manipulation time and a change amount of the tool center point are previously stored in memory, and an accumulated working time is read when moving the tool center point to a moving target position. Thus, the changed position of the tool center point is determined based on the data stored in the memory. The moving target position of the tool center point is corrected on the basis of the changed amount. Thus, the tool center point is aligned with the moving target position. Accordingly, the position of the tool center point is corrected in accordance with the change amount, and various works are accurately performed relative to the moving target position on a workpiece. Therefore, a spring mechanism required in the prior art is eliminated. In addition, a plurality of robot manipulation programs can be reduced to a single program.

6 Claims, 4 Drawing Sheets

METHOD OF CORRECTING A POSITION OF A TOOL CENTER POINT

TECHNICAL FIELD

The present invention relates to a method of correcting a tool center point, which corrects a position of the tool center point of a robot, and in particular, to a method which corrects a change amount of the tool center point caused by consumption, wear or the like, thus accurately controlling the position of the tool center point.

BACKGROUND ART

Tools attached to a robot are consumed or worn by different using modes. For example, in the case of a spot welding robot, a welding gun is used as a tool, but the gun tip is consumed in accordance with the number of robot's works. In this case, a position of a TCP (Tool Center Point) is changed by the consumption of the tip, so that the robot is required to correct the changed position to perform the welding operation. For this reason, a spring mechanism for correcting the change is ordinarily located in a mechanical section of the welding gun.

Further, for example, in the case of a grinding robot, a grinder is used as a tool, but the grinder attached to the robot is worn in accordance with the working time when grinding the workpiece surface. In this case, there is also a need of correcting the changed position of the TCP, for this reason, a spring mechanism for pressing the grinder against the workpiece must be attached to the grinder likewise.

However, the spring mechanisms as mentioned above causes problems such as of making the welding gun or grinder heavy and the cost higher. In addition, in the case of the grinding robot, there is a limit of pressing force by the spring mechanism, so that the grinder must be exchanged when exceeding the limit. This increases the frequency of the grinder change.

Furthermore, in the case of the grinding robot, in order to allow the robot to perform suitable grinding operations in accordance with the consumption of the grinder, it is required to prepare a plurality of robot manipulation programs in addition to the spring mechanism. For this reason, it is troublesome and difficult to handle and control the robot manipulation programs.

DISCLOSURE OF THE INVENTION

The present invention has been made in view of the above problems. Therefore, an object of the present invention is to provide a method of correcting a position of a tool center point, which is capable of designing lightweight and inexpensive tools such as a welding gun, grinder or the like.

Another object of the present invention is to provide a method of correcting a position of a tool center point, which is capable of readily handling and controlling robot manipulation programs.

To achieve the above problems, in the present invention, there is provided a method of correcting a position of a tool center point, which corrects the position of the tool center point of the robot, comprising the steps of: previously storing in memory the relationship between the working time of the robot and a change amount of the tool center point of the robot, accumulating the working time, determining the change amount of the tool center point corresponding to the accumulated working time, when the tool center point is aligned with a moving target position, correcting the moving target position of the tool center point on the basis of the determined change amount of the tool center point, and moving the tool center point to the corrected moving target position.

Data indicating the relationship between the working time and the change amount of the tool center point of the robot are previously stored in memory. Further, the time when the robot is working is accumulated. Then, when the tool center point is moved to the moving target position, the change amount of the tool center point corresponding to the accumulated working time is determined on the basis of the data stored in the memory. The moving target position of the tool center point is corrected on the basis of the determined changed amount of the tool center point. Thus, the tool center point is moved to the corrected moving target position. Accordingly, even though the position of the tool center point is changed by the consumption, wear or the like, the position of the tool center point is corrected in accordance with the change amount. This allows the accurate performance of the spot welding or grinding relative to the moving target position on the workpiece surface, As a consequence, it is unnecessary to attach the spring mechanism required in the prior art to the robot. In addition, it is possible to reduce a plurality of robot manipulation programs a single program.

BEST MODE OF CARRYING OUT THE INVENTION

One embodiment of the present invention will be described with reference to the drawings below.

Figure 2:
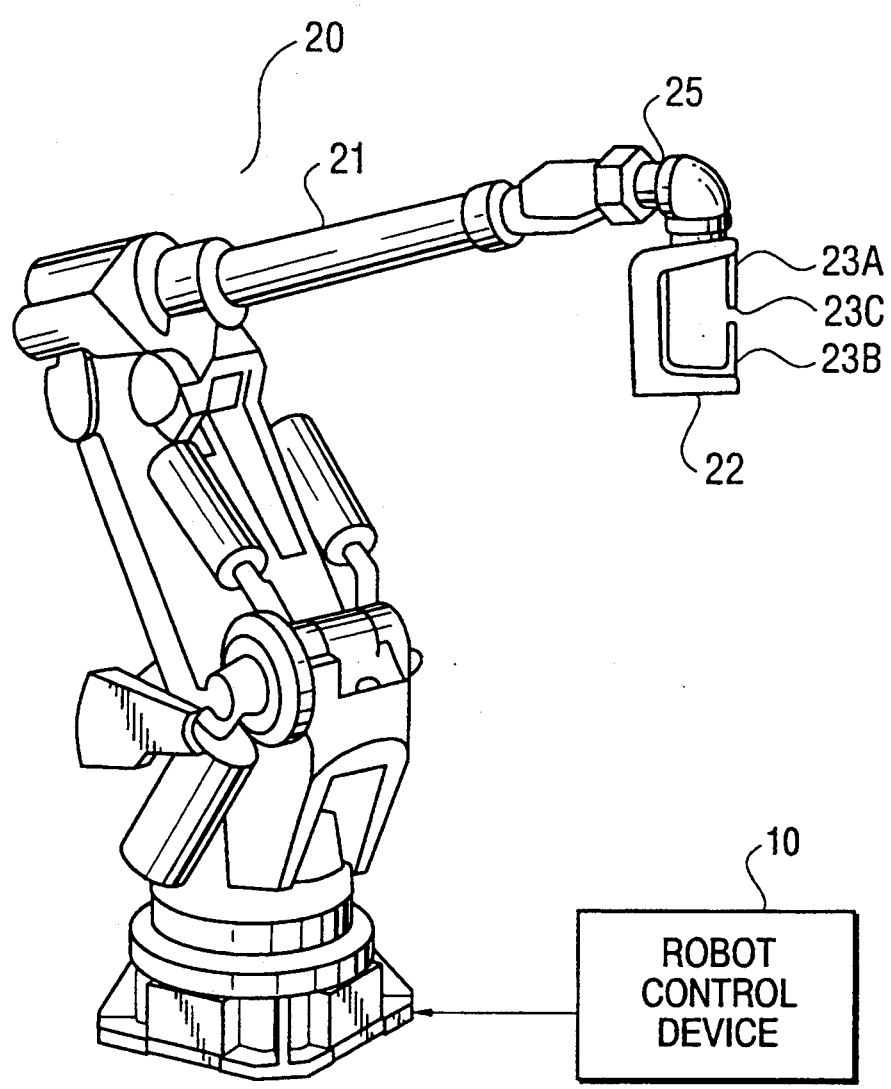
FIG. 2 is a view schematically showing the configuration of a robot system for carrying out the method of correcting the position of the tool center point according to the present invention.

FIG. 2 is a view schematically showing a configuration of a robot system for carrying out a method of correcting a position of a tool center point. In the figure, a robot 20 is a multiple joint spot welding robot, and a welding gun 22 for the spot welding is attached to a flange 25 of the distal end of an arm 21 as a tool. A robot control device 10 mainly comprises a micro processor which will be described later, and drives respective servo motor of the robot 20, thus controlling the operations of the robot 20 and welding gun 22 pursuant to preset operating programs.

The spot welding is carried out by using the welding gun 22 which includes two gun tips 23A and 23B. The spot welding is performed relative to a workpiece interposed between the gun tips 23A and 23B. The lower gun tip 23B is positioned, while the upper gun tip 23A is moved in the up-and-down direction, thus the spot welding being performed. For this reason, the distal end portion of the gun tip 23A is consumed in accordance with the working time of the robot, so that the position of distal end portion of gun tip 23A deviates from the preset position. Accordingly, in order to accurately perform the spot welding on the workpiece, there is a need of correcting the positional change (caused by consumption) of the distal end portion (referred to as "TCP23C" later) of the gun tip 23A. In this case, the position of the TCP23C is represented on a hand coordinate system with the surface of the flange 25 being a base. Next, the method of correcting the position of the TCP23C will be explained on the basis of flowchart later.

Figure 1:
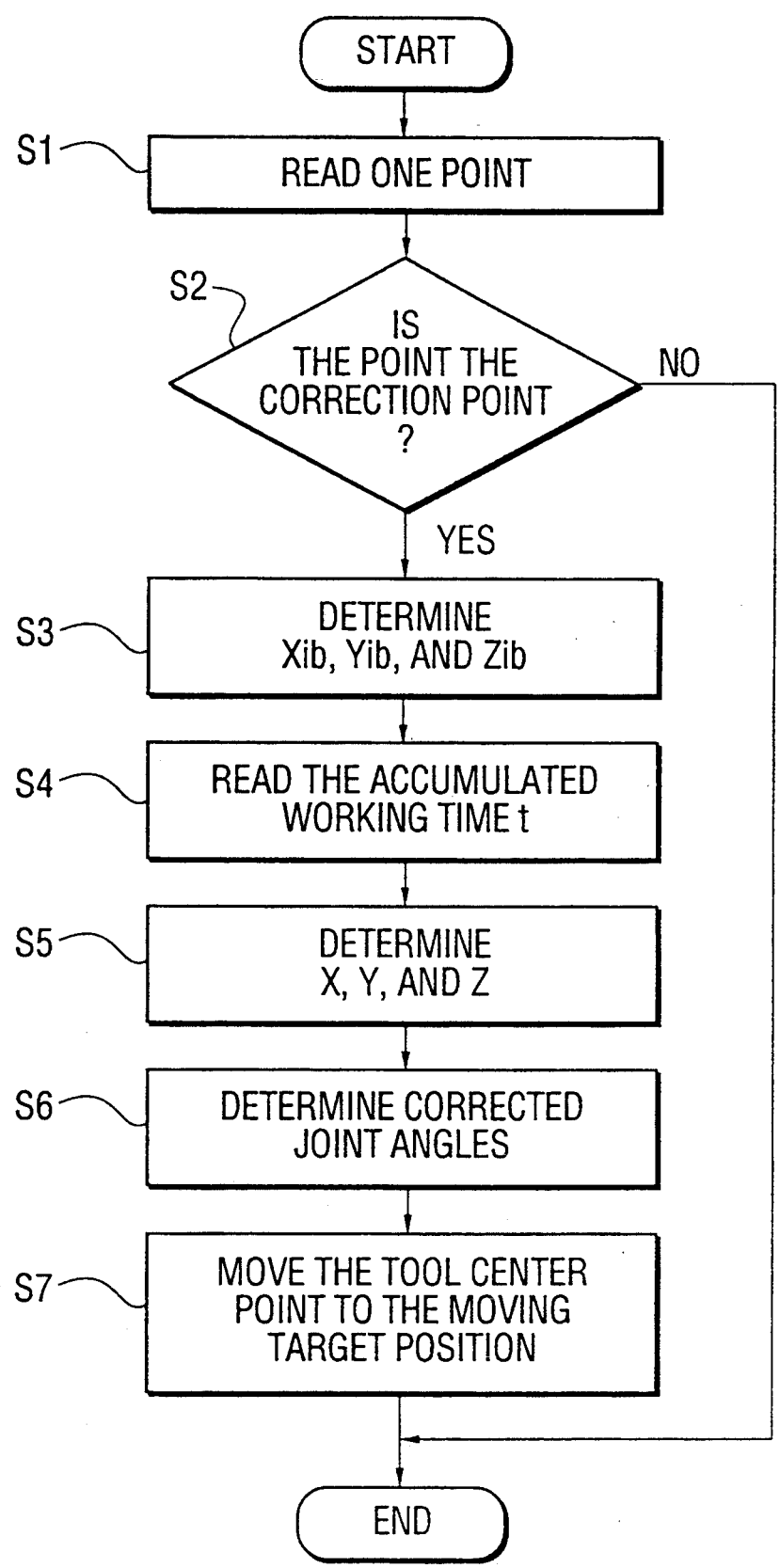
FIG. 1 is a flowchart showing the procedures for carrying out a method of correcting a position of a tool center point according to the present invention.

FIG. 1 is a flowchart for carrying out the method of correcting a tool center point according to the present invention; in the figure, a numeral next to S denotes a step number.

Figure 3:
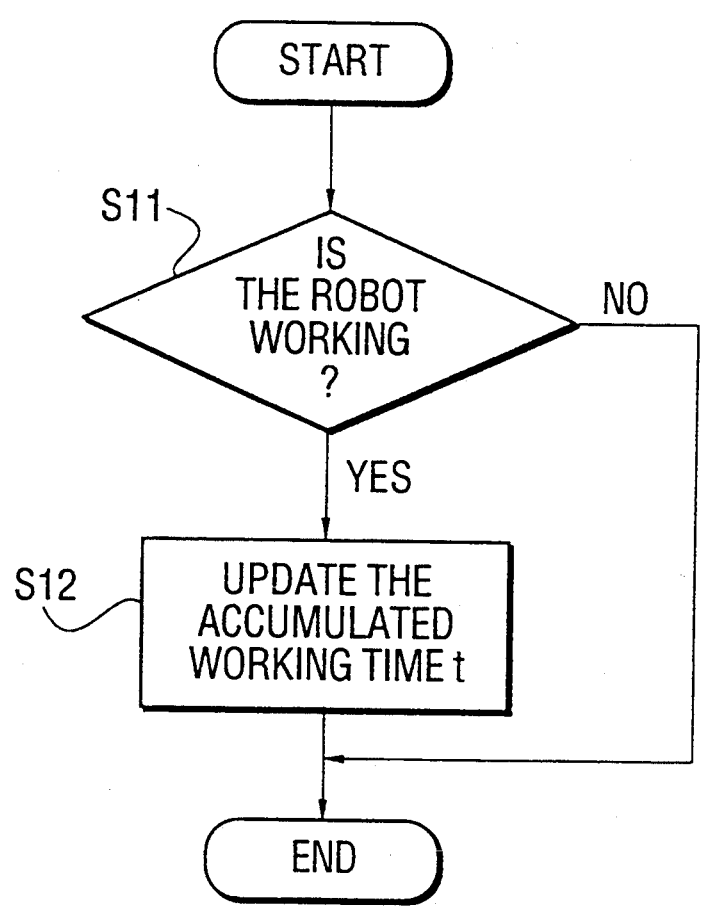
FIG. 3 is a flowchart for determining the accumulated working time.

- [S1] First, the robot control device reads one point from programming data. The programming data is an initial position data for the TCP23C which the operator previously taught to the robot 20, and is stored in memory (nonvolatile memory).
- [S2] It is decided whether or not the point is a correction point. The correction point is a point which the operator presets as a point to be corrected in all points. If the point is the correction point, the sequence advances to S3. If not, the sequence advances to S7, and the tool center point is moved to a target position previously programmed without correction.
- [S3] Determine coordinate values Xib, Yib and Zib when the initial position of TCP23C is represented on the base coordinate system. In other words, a direct transformation is carried out on the basis of respective joint angle data representing the flange 25 surface of the distal end of the arm 21, and the initial position (xi, yi, zi) of TCP23C which is represented on the hand coordinate system with the flange 25 surface is a base. Thus, the initial position of TCP23C being represented on the base coordinate system.
- [S4] Read accumulated working time t. The accumulated working time t is always updated and stored in memory, as shown in the flowchart of FIG. 3 which will be described later. In this case, the accumulated working time t stored in the memory is cleared by an initialization when changing the consumed gun tip to a new one.
- [S5] Determine an actual position (x, y, z) of the TCP23C changed by consumption on the hand coordinate system. The actual position (x, y, z) of the TCP23C is represented as follows:

$x = xi + f(t)$ $y = yi + g(t)$ $z = zi + h(t)$ where, xi, yi, zi: initial position of TCP23C f(t), g(t), h(t): change amount in respective x, y and z direction of TCP23C t: accumulated working time In this case, the change amount f(t), g(t) and h(t) of TCP23C is determined on the basis of the data indicating the relationship between working time (or the number of robot's works) preset by the operator and consumption (change amount) of the gun tip.

- [S6] Correct the changed position of TCP23C, and newly determine the respective joint angle values so that the position of TCP23C can be aligned with a newly moving target point. Then, newly set a position and an orientation of the flange 25 on the basis of the coordinate values (Xib, Yib, Zib) when the initial position of TCP23C determined at step S3 is represented in the base coordinate system, and the actual position (x, y, z) of TCP23C determined at step S5, and the respective joint angle values are determined by making the position and orientation of an inverse transformation.
- [S7] Move the TCP23C to the moving target point in accordance with the corrected respective joint angle.

FIG. 3 is a flowchart for determining the accumulated working time.

- [S11] It is decided whether or not the robot is working. If it is working, the sequence advances to S12. If not, the sequence ends as it is.
- [S12] Update the accumulated working time t and write it in memory.

As described above, data showing the relationship between working time of the robot 20 and consumption (change amount of TCP23C) of the gun tip is previously stored in memory, and the change amount of TCP23C corresponding to the accumulated working time t is determined on the basis of the data. Then, correction is made in accordance with the change amount. Thus, the moving target point of TCP23C is set. Accordingly, the spot welding is accurately carried out relative to the moving target point on a workpiece. This eliminates the spring mechanism required in the prior art, and provides lightweight and inexpensive welding guns, In the above explanation, the change amount of the TCP23C is determined on the basis of data previously stored in the memory. However, a TCP23C may also be directly measured by using external sensors such as a camera or the Like, and the change amount of the TCP23C is determined on the basis of the measurement results.

Figure 4:
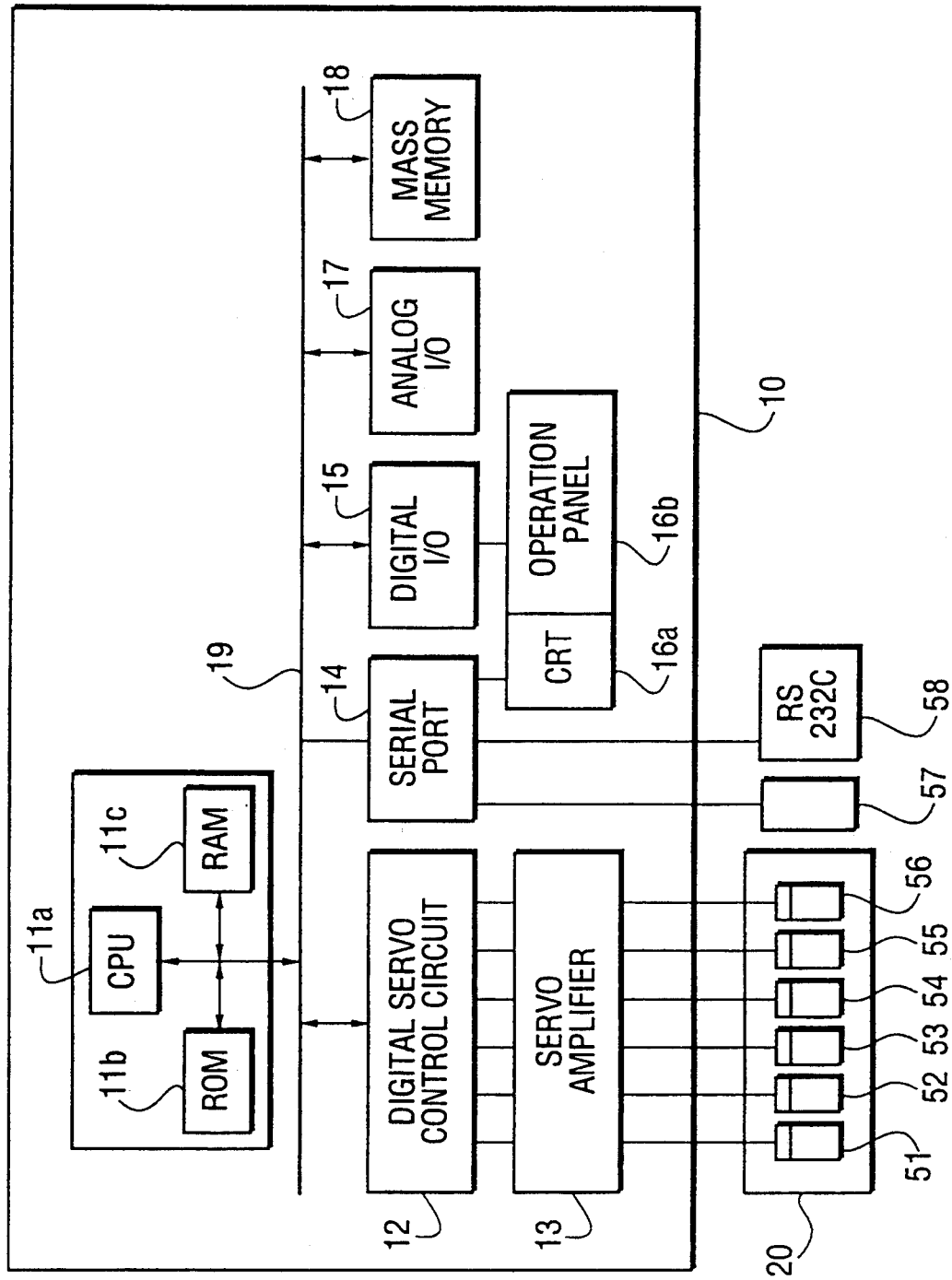
FIG. 4 is a block diagram schematically showing a robot control device.

FIG. 4 is a block diagram schematically showing the robot control device 10. The robot control device 10 includes a processor board 11 comprising a processor 11a, ROM 11b and RAM 11c. The processor 11a controls the entirety of robot control device pursuant to system programs stored in the ROM 11b. The RAM 11c stores various data such as operating programs for the robot 20 or programs for carrying out the present invention. Part of the RAM 11c is constituted as a nonvolatile memory in which the operating programs is stored. The processor board 11 is connected to a bus 19.

digital servo control circuit 12 is connected to the bus 19 and drives servo motors 51, 52, 53, 54, 55 and 56 are driven in accordance with a command from the processor board 11 through a servo amplifier 13. These servo motors 51 to 56 are included in the robot 20, and operate respective axes of the robot 20.

A serial port 14, digital I/0 15, analog I/0 17 and mass memory 18 are connected to the bus 19, respectively. A teaching operation panel 57 with a display, other RS232C equipment 58 and CRT 16a are connected to the serial port 14, respectively, and an operation panel 16b is connected to the digital I/0 15. Further, the mass memory 18 stores the initial position data of the TCP23C previously taught, data indicating the relationship between the working time and change amount of the TCP23C, accumulated and working time t or the like.

In the above explanation, although the spot welding robot is embodied, the present invention may be applied in robots performing other operations, for example, a robot for grinding. In this case, a grinder is used as a tool, but it is unnecessary to provide a spring mechanism for pressing the grinder against the workpiece. Therefore, a lightweight and inexpensive grinder can be provided. In addition, it is possible to reduce a plurality of robot manipulation programs which are set in accordance with wear of the grinder a single program, so that the robot manipulation programs can readily be handled and controlled.

Moreover, the respective joint angle values are used as positional command data to the robot, but other positional command data may also be applied in the present invention. For example, the position of TCP23C and an orientation of a tool represented on Cartesian coordinate system such as a workpiece coordinate system, are used as the positional command data, and this case may also be applied in the present invention likewise, As seen from the above description, according to the present invention, there is provided a method of correcting a position of a tool center point comprising the steps of: previously storing in memory data indicating the relationship between the working time of robot and the consumption of tool center point, determining a positional change of TCP corresponding to the accumulated working time on the basis of the data; and correcting the position in accordance with the change, thus setting a moving target point for the TCP. Accordingly, it is possible to accurately perform the robot manipulations such as spot welding, grinding or the like relative to the moving target point on the workpiece. This allows the elimination of a spring mechanism required in the prior art, and the provision of lightweight and inexpensive tools. In addition, it is possible to make a plurality of robot manipulation programs which are set in accordance with the change amount of the tool center point into a single program, so that the robot manipulation programs can readily be handled and controlled.

I claim:

1. A method of correcting a position of a tool center point, which corrects the position of the tool center point of a robot, comprising the steps of:

previously storing in memory the relationship between a working time of the robot and a change amount of the tool center point of the robot;

accumulating the working time;

determining the change amount of the tool center point corresponding to the accumulated working time, when the tool center point is aligned with the moving target position;

correcting the moving target position of the tool center point on the basis of the determined change amount of the tool center point; and moving the tool center point to the corrected moving target position.

2. A method of correcting a position of a tool center point according to claim 1, wherein the accumulated working time is initialized when the tool is changed.

3. A method of correcting a position of a tool center point according to claim 1, wherein the moving target position of the tool center point is corrected relative to a preset correction point.

4. A method of correcting a position of a tool center point of a robot, comprising the steps of:

storing in memory a relationship between a predetermined working time of the robot and a predetermined change amount of the tool center point of the robot;

accumulating an actual working time;

determining the predetermined change amount of the tool center point corresponding to the actual accumulated working time based on the relationship between the predetermined working time and the predetermined change amount of the tool center point, when the tool center point is aligned with a moving target position;

correcting the moving target position of the tool center point on the basis of the determined change amount of the tool center point; and moving the tool center point to the corrected moving target position.

5. A method of correcting a position of a tool center point according to claim 4, wherein the accumulated working time is initialized when the tool is changed.

6. A method of correcting a position of a tool center point according to claim 4, wherein the moving target position of the tool center point is corrected relative to a preset correction point.

* * * * *

UNITED STATES PATENT AND TRADEMARK OFFICE
CERTIFICATE OF CORRECTION

PATENT NO. : 5,451,850
DATED : September 19, 1995
INVENTOR(S) : Tatsuo KARAKAMA

It is certified that error appears in the above-indentified patent and that said Letters Patent is hereby corrected as shown below:

Column 3, line 9, after "of" insert --a--.

Column 4, line 67, after "TCP23C," insert --and--.
line 67, after "accumulated" delete -- and --.
Column 5, line 10, after "grinder" insert --to--; and
line 18, after "system" insert --,--.

Signed and Sealed this

Thirtieth Day of January, 1996

Attest:

BRUCE LEHMAN

Attesting Officer

Commissioner of Patents and Trademarks